United States Patent Office 3,227,591
Patented Jan. 4, 1966

3,227,591
FILM TECHNIQUES
Robert L. Lambert, Emporium, and William R. McKeirnan, Crosby, Pa., assignors to Sylvania Electric Products Inc., a corporation of Delaware
No Drawing. Filed Apr. 26, 1963, Ser. No. 276,100
1 Claim. (Cl. 156—89)

This invention relates to a self-supporting film and the use thereof in a sealing process and more particularly to a self-supporting film which may be adhered to a surface or disposed intermediate surfaces to form a bonded layer thereon or a bond therebetween.

Numerous techniques are used in the art of bonding materials, including the formation of bonded surface layers on materials adapted for attachment thereto of a second material to form a seal and especially a vacuum-tight seal. For instance, a ceramic surface may be bonded to a metal surface by a technique often referred to as a "sintered metal process" wherein a ceramic is provided with a metallized layer, then a plated layer, and finally a brazed layer bonding the plated layer to a metal surface. Also, a metal surface may be bonded to a glass surface by oxidizing the metal surface and fusing a bonded glass layer thereon whereupon a tube or cylinder of glass may be attached to form a glass-to-metal seal. Further, metal surfaces may be brazed and glass surfaces fused by disposing a eutectic or low melting material intermediate the surfaces and applying thereto sufficient heat to sinter, fuse, or flow the intermediate material and bond the surfaces.

In all of the above-mentioned processes the problem of repeatedly and consistently applying a uniform surface layer which will remain confined to a restricted area and have a minimum variation in density, thickness, and surface smoothness is one which still exists despite numerous investigations. Further, presently known techniques impose numerous obstacles to automation and cost reduction. Additionally, known techniques for obtaining the uniformity required in present-day repetitive sealing operations require highly skilled and well-trained personnel.

Therefore, it is an object of this invention to enhance the reproducible uniformity of a layer bonded to a surface and adapted for the sealing of a material surface thereto.

A further object of this invention is to reduce the variations in density, thickness, and surface smoothness of a bonding material disposed intermediate sealing surfaces by providing a self-supporting film adapted to a sealing process.

A still further object of this invention is the provision of a self-supporting film adapted to the bonding of material surfaces which reduces to a task of ordinary skill the technique of repeatedly applying a uniform surface layer to a desired restricted and confined area.

Still another object of this invention is the provision of a self-supporting film for bonding material surfaces which is adapted to an automated process.

An additional object of this invention is the provision of a process for enhancing the consistency and uniformity of the seal in a sealing process.

Briefly, these objects are fulfilled in one aspect of the invention by the provision of a self-supporting film consisting essentially of an organic binder and a plasticizer for the binder with addatives of metal particles, glass particles, eutectic compound particles, hydrides such as zirconium and titanium, or combinations thereof homogeneously dispersed therein. This film is adaptable to any of the commonly known types of seal such as ceramic-to-metal, ceramic-to-glass, ceramic-to-ceramic, glass-to-glass, glass-to-metal, and metal-to-metal sealing depending upon the additives dispersed in the film.

Further, in making seals the film may be shaped or cut to a desired configuration or size and adhered to a surface by wetting the surface with a solvent for the film and touching the film thereto. Upon contact, the film is softened and adopts the contour of the surface. Subsequently, sufficient heat is applied to volatilize the binder and plasticizer and bond the additive particles to each other and to the surface.

Additionally, the film may be disposed intermediate and contacting two surfaces whereupon the application of sufficient heat bonds the surfaces together. Moreover, a series of bonded layers may be formed by alternately adhering and heating a plurality of self-supporting films to each other.

For a better understanding of the present invention, together with other and further objects, advantages, and capabilities thereof, reference is made to the following disclosure and appended claim.

A self-supporting film adapted for use in a sealing process may be prepared from a suspension comprising an organic binder and a binder plasticizer dissolved in a mixture of volatile organic solvents wherein powered particle additives are homogeneous dispersed. For example, the following formulations are typical of a suspension having additives therein and from which a self-supporting film adapted to a sealing process may be formed:

| | Metal Particles | Hydrides | Glass Particles | Oxide Particles | Brazing Powder |
|---|---|---|---|---|---|
| Ethylene Carbonate, gms | 60 | 25 | 25 | 50 | 10 |
| Toluene, mls | 230 | 100 | 100 | 250 | 40 |
| Synasol, mls | 60 | 25 | 25 | 50 | 10 |
| Butyl Carbitol, mls | 10 | 4 | 4 | 10 | 2 |
| Ethyl Cellulose N-300, gms | 18 | 8 | 8 | 20 | 2 |
| Molybdenum (325 Mesh), gms | 500 | | | | |
| Titanium Hydride, gms | | 200 | | | |
| Corning Glass #7052, gms | | | 200 | | |
| Nickelous Oxide, gms | | | | 400 | |
| Brazing Powder, gms | | | | | 100 |

The ethyl cellulose N-300 binder in the above formulation has an ethoxyl content of between 47.5 and 49.0 percent by weight and a viscosity of approximately 300 centipoises in a 5.0 percent solution of 80:20 toluene to Synasol. The butyl Carbitol has been defined in Merck's Index, sixth edition, as diethylene glycol monobutyl ether.

The ethyl cellulose N-300 binder may be in the range of 1 to 10 percent by weight of solids depending upon the desired density or porosity of the resultant bonded surface layer and a preferred value is approximately 3.48 percent. Further, the binder must be compatible with the solvents and both must be combustible below the sintering, reducing, and sintering, or fusing temperature of the contained particles. Moreover, the binder and solvents must be combustible below the temperature at which a contained eutectic compound or alloy decomposes and flows. Among the many examples of applicable organic binders are: nylon, methyl, methacrylate, polyvinyl alcohol, and methyl cellulose.

A temporary plasticizer such as butyl carbitol in the range of approximately 0.5 to 50 percent and preferably approximately 35 percent based on the weight of ethyl cellulose is particularly adapted to the presented formulation. The amount of plasticizer is, of course, dependent upon the density and flexibility desired in the self-supporting film. Moreover, the variety of plasticizing agents for ethyl cellulose binders is unusually large and includes most known classes of flexible agents for coatings and plastics. Additionally, plasticizers of a more permanent nature such as castor oil, butyl stearate, and dibutyl phthalate may be used although the more temporary plasticizers are preferred.

Additionally, the ethylene carbonate, which may be in the range of approximately 1 to 10 percent and in the preferred formulation of 7.2 percent by weight of the total suspension, acts not only as a temporary plasticizer but aids in controlling the film density by producing voids in the film as the other solvents are vaporized therefrom.

A mixture of organic solvents such as the above listed toluene and Synasol having different temperatures and rates of evaporation provides many advantages over a single solvent. For instance, the solubility of the binder is improved, the viscosity of the suspension is more easily duplicated, and the swelling of the cellulose is better controlled. Further, the use of a nonpolar solvent such as toluene, which is the last to leave the film, imparts strength to the film for subsequent handling thereof without fear of rupture. Although an 80:20 ratio of toluene to Synasol is preferred, ratios up to and including 10:90 toluene to Synasol may be used without significant change in suspension viscosity. Moreover, numerous solvents may be used in the above-mentioned formulations including methanol, benzene, methyl formate, heptane, acetone, and even water in a binder such as hydroxy-ethyl cellulose.

The choice of particle additives applicable to the above mentioned formulations is practically unlimited except that they must be either sinterable, fusible, or form a flowable material when heated which solidifies and bonds upon cooling. Further, it is preferred that the additives be sinterable, fusible, or flowable at a temperature below the deformation temperature of the materials bonded or bonded thereto. Additionally, the density and shape of the particle additives is important in determining the porosity of the resultant film and particles less than 55 microns are applicable but a preferred size is less than 44 microns. Moreover, a particle weight in the range of 25 percent to 75 percent by weight of the total suspension with a preferred value of approximately 60 percent is applicable to the recited metal oxide and brazing powder formulations while a weight of 40 percent to 70 percent and preferably about 58 percent of the total suspension weight is appropriate for the hydride and glass particle formulations.

The above recited formulations may be prepared in a manner previously disclosed in Patent No. 3,017,281, "Formulation for Casting Pigmented Film," issued to Lambert and McKeirnan, and then cast on a casting wheel according to the teaching of Crosby and Stoll in Patent No. 2,965,927. Although other processes may be used for preparing a suspension and casting a self-supporting film, these processes have been found to be well suited for producing a pliable self-supporting film having a uniformly smooth surface, very minute variations in density and thickness, and a consistency and repeatability throughout, which as far as is known, had been previously unobtainable.

Thus, having provided a self-supporting film, unique processes for the use thereof in bonding surfaces of similar and dissimilar materials and providing bonded layers on a surface are made available. Further, vacuum-tight bonding of surfaces and sealing processes have been found to be enhanced when a self-supporting film is employed.

In a process for bonding or forming a bonded layer, the self-supporting film is cut, stamped, punched, or shaped in any one of numerous ways to a desired size or configuration. Thereafter, the film is adhered to a surface by wetting the surface with a solvent for the binder in the film and touching the film thereto. Upon contact between film and solvent, the solvent progressively dissolves some of the film binder and softens the film whereupon the surface tension of the solvent causes the pliable film to adopt the contour of the surface. Almost immediately thereafter the solvent evaporates from the wetted surface leaving the film attached thereto whereupon the surface and film may be transported or handled without fear of rupture or loosening of the adherent film.

Subsequently, the surface and adherent film are subjected to a heat treatment such as the frequently encountered processes of vacuum firing, inert atmosphere firing, air firing, hydrogen atmosphere firing, or any one of a number of ways of heat treating depending upon the constituents of the film and surface. Herein, the organic binder and plasticizer are volatilized and the film additives bonded to each other and to the surface to provide a bonded layer thereon.

Alternately, the self-supporting film may be adhered to a first surface and a second surface placed in contact therewith. Upon application of sufficient heat, the binder and plasticizer are volatilized and the additive bonds the surfaces in a vacuum-tight seal.

Additionally, a series of bonded layers may be formed by repeatedly applying a self-supporting film to a surface and heating the film to form a layer bonded thereon and then applying a second film to the bonded layer and heating the second film to form a second layer bonded to the first layer.

The process is further detailed by way of the following examples which are in no way to be construed as limitations but rather as an aid to understanding and applying the process under various conditions encountered in the sealing of materials.

*Ceramic-to-metal*

In one particular ceramic-to-metal sealing process, the ceramic is provided with a metallized layer bonded thereto, a plated layer bonded to the metallized layer, and a brazing material disposed intermediate the plated layer and a metal surface bonding these two surfaces together. Thus, there is formed a vacuum-tight seal between a ceramic surface and a metal surface.

As a specific example, a self-supporting metallizing film was made from the previously presented metal particle formulation wherein was contained molybdenum metal particle additives in an amount of about 59.94 percent by weight of the total suspension. Using the casting technique previously described, the suspension was cast into a film having a width of five inches, a thickness of about .002 inch, a density of about 3.0 gms./cm.$^3$, and a metal particle weight of approximately 96.52 percent of the total film weight.

This film was adhered to a high alumina (over 94 percent alumina ceramic) by wetting the ceramic with Synasol and touching the film thereto. Upon contact between film and solvent, the film was softened by the solvent and the surface tension thereof caused the soft pliable film to adopt the contour of the ceramic and adhere thereto.

Subsequently, the ceramic and adherent film was fired in a hydrogen atmosphere for about 15 minutes at a temperature in the range of 1300° C. to 1500° C. and preferably at approximately 1400° C. During this firing period, the organic binder and plasticizer were volatilized and the molybdenum metal particles were sintered and bonded to the ceramic forming a metallized surface layer thereon.

Following, a self-supporting plating film was made in a manner substantially the same as above except that the previously described oxide particle formulation was used wherein the additive was nickelous oxide particles of about 54.38 percent by weight. The resultant film was cast in a width of 5 inches, a thickness of about 0.002 inch, a density of approximately 2.42 gms./cm.$^3$, and had a metal particle weight of about 95.24 percent of the total film weight.

This film was then adhered to the metallized ceramic in a manner previously described for adhering films to a surface and subsequently fired in a hydrogen atmosphere for a period of about 15 minutes at a temperature in the range of 900° C. to 1100° C. and preferably at approximately 1000° C. Thereupon, the organic binder and plasticizer volatilized and the nickelous oxide was reduced to nickel particles, sintered, and bonded to the metallized layer.

Additionally, a self-supporting brazing film was made in accordance with the previously detailed brazing powder formulation wherein the particle additive was Handy and Herman Brazing Alloy BT consisting essentially of 72 percent silver and 28 percent copper in an amount of approximately 63.90 percent by weight of the suspension. This suspension was cast in a film, as previously described, having a width of 5 inches, a thickness of about 0.002 inch, a density of approximately 2.80 gms./cm.$^3$, and a particle weight of about 98.04 percent of the total film weight.

This self-supporting brazing film was adhered to the nickel-plated surface as described above and a copper metal surface placed in contact therewith to form an assembly. This assembly was then placed in a hydrogen atmosphere for a period of about 15 minutes at a temperature in the range of 700° C. to 900° C. and preferably at approximately 800° C. whereupon the organic binder and plasticizer were volatilized and the brazing additive liquified. Upon cooling, the liquidous brazing additive solidified and bonded the nickel-plated surface and the copper metal surface thereby completing a vacuum-tight bond between the ceramic surface and a metal surface.

Moreover, an alternate metallized layer and ultimately a ceramic-to-metal seal was provided by replacing the molybdenum metal particle additive in the metal particle formulation with a combination additive consisting essentially of about 85 percent by weight molybdenum particles, 10 percent by weight manganese particles, and 5 percent by weight titanium hydride.

This film was adhered to a high alumina ceramic as discussed for the molybdenum metal particle film, fired under similar conditions, plated, and brazed with the above mentioned plating and brazing films and provided a vacuum-tight seal between a ceramic surface and the metal surface.

*Glass-to-metal*

In one glass-to-metal sealing process, the metal surface is provided with an oxide layer thereon and a layer of glass is applied thereto. Subsequently, a glass surface is fused to the glass layer to provide a glass-to-metal seal.

One particular technique which is especially applicable in vacuum tube manufacture wherein vacuum-tight seals are a requirement is the use of a self-supporting film wherein are contained powdered glass particles. Using the glass particle formulation previously presented wherein was contained a glass particle additive of type #7052 Corning Glass in an amount of about 58.3 percent by weight of the suspension, a self-supporting film was cast having a width of five inches, a thickness of about 0.002 inch, and a density of approximately 2.0 gms./cm.$^3$. The film was cut to a desired configuration and adhered to a surface by wetting the surface with Synasol, a solvent for the film, and touching the film thereto. Upon contact between the film and solvent, the solvent softened the film and caused the film to adopt the contour of the surface. Thereupon, the solvent evaporated leaving the film adhered to the surface. Specifically, the surface is a nickel-cobalt-iron alloy known commercially as Kovar and consisting essentially of 18 percent cobalt, 28 percent nickel, and the balance being iron whereon an oxide has been formed by heating to a temperature above 650° C. in a slightly oxidizing atmosphere. Subsequently, the Kovar surface and adherent film were fired in an electric furnace oven for about 6 minutes at a temperature of about 1000° C. whereupon the organic plasticizer and binder of the film were volatilized therefrom and the glass particles fused into a layer bonded to the Kovar surface. Thereafter, using any of the common glass fusion processes, a glass tube was fused to the glass layer without disrupting the bond between the metal surface and the fused glass layer.

*Metal-to-metal*

In the brazing of metals, numerous eutectic alloys are available and adaptable to the self-supporting film technique previously described. For instance, the process and formulation for bonding a plating film to a metallizing film was fully described in the ceramic-to-metal sealing processes above. Further, copper surfaces were brazed by means of a self-supporting film made according to the above-mentioned brazing film formulation wherein the additive was Ascobraze 60FB consisting essentially of 60 percent copper and 40 percent silver. The suspension was cast into a film, adhered to one copper surface as previously described, and a second copper surface placed in contact therewith to form an assembly. The temperature of the assembly was raised to about 830° C. whereupon the heat was removed and the assembly allowed to cool. At a temperature of about 780° C., the eutectic compound which had been liquidous at 830° C. solidified and bonded the copper surfaces.

*Ceramic-to-ceramic*

In one process for making ceramic-to-ceramic seal, a self-supporting film containing a titanium hydride additive is adhered to a ceramic surface. A second ceramic surface is placed in contact therewith to form an assembly and the assembly is heated until the hydride is reduced and bonds the ceramic surfaces.

For example, a self-supporting film was made according to a previously described procedure using the previously presented hydride formulation wherein the additive was titanium hydride in an amount of about 54.38 percent by weight. This suspension was cast into a self-supporting film in a manner already presented and provided a film having a width of five inches, a thickness of about 0.002 inch, a density of approximately 2.45 gms./cm.$^3$, and a hydride additive weight of about 95.20 percent of the total film weight.

This film was then adhered to a high alumina (above 94 percent alumina) ceramic surface in a manner previously detailed. A second high alumina ceramic surface was then placed in contact therewith to form an assembly. The assembly was then fired at a temperature of about 900° C. in an inert atmosphere whereupon the titanium hydride decomposed and bonded the ceramic surfaces forming a vacuum-tight seal.

*Glass-to-glass*

In one particular process for making a glass-to-glass seal, a self-supporting film having dispersed therein a fusible additive is adhered to one of the glass surfaces to be joined and a second glass surface is placed in contact therewith. Thereupon, sufficient heat is applied to cause the bonding of the glass surfaces.

For example, in sealing lime glass surfaces designated as 0080 glass by the Corning Glass Works, a suspension similar to the previously recited glass particle formulation was made wherein the Corning Glass #7052 additive was replaced with type 4B leadless frit. This particular frit is available from the O. Hammond Company and was purchased in a size of 325 mesh. Further, the frit was added in an amount of about 58.3 percent by weight of the suspension.

This suspension was then cast into a five-inch self-supporting film having a density of about 2.0 gms./cm.$^3$ and a thickness of approximately 0.002 inch. Thereupon, the film was cut to a desired configuration and adhered to a glass surface by wetting the surface with a solvent for the film, Synasol, and touching the film thereto. Following, a second glass surface was placed in contact with the film and the glass surfaces with the film intermediate thereto were fixed for about two minutes at a temperature of approximately 675° C. As a result, the volatile constituents of the film were driven off and the frit therein bonded the glass surfaces together.

Although the above listed examples refer to specific materials and conditions, it is to be understood that the particles, formulations, and firing conditions can be altered. For instance, metal particles such as molybdenum, tantalum, rhenium, iron, manganese, aluminum, titanium, and zirconium are well suited to the above identified metal particle formulation and especially appropriate in metallizing a ceramic to be used in a ceramic-to-metal sealing process. Further, hydrides of zirconium and titanium and alloys thereof such as titanium-nickel, copper-zirconium, copper-titanium, zirconium-nickel, and zirconium-iron as well as previously identified combinations of hydrides, hydride alloys, and metal particles find common usage in ceramic-to-metal and ceramic-to-ceramic sealing processes.

Additionally, glass particles and eutectic compounds of practically unlimited scope are adapted to the process as long as they can be powdered and are fusible, sinterable, or will liquify and flow upon application of heat and solidify upon cooling to form a bond between contacting material surfaces.

Moreover, a combination of self-supporting films is especially appropriate when sealing dissimilar materials having different temperatures of deformation. For example, in the ceramic-to-metal sealing process previously presented, the metallizing film was bonded to a high alumina ceramic surface in a hydrogen atmosphere at a temperature in the range of 1300° C. to 1500° C. This metallized ceramic was then plated with nickel by adhering a self-supporting nickelous oxide film and firing the assembly at a temperature in the range of 900° C. to 1100° C. Subsequently, the nickel-plated surface and a copper metal surface were bonded by disposing a self-supporting brazing film intermediate thereto and firing at a temperature in the range of 700° C. to 900° C., whereupon a vacuum-tight seal between a ceramic surface and a metal surface was completed with the metal surface never having been exposed to a temperature above the 900° C. brazing temperature.

Additionally, the bonding of glass surfaces in a similar manner is equally appropriate and applicable. Further, metal surfaces or glass surfaces having a similar temperature of deformation may be bonded consistently and uniformly by using a self-supporting film disposed intermediate thereto containing a eutectic compound or powdered glass particles which form a bond at a temperature less than the previously mentioned deformation temperature.

Thus, there has been provided a self-supporting film especially adapted for adherence to a surface and subsequent formation of a metallized layer or a fused glass layer bonded thereto and especially well suited to sealing processes. Further, the film may contain therein bonding materials which do not form a separate layer but rather flow upon the application of heat and bond contacting metals upon cooling. Moreover, this self-supporting film is pliable and readily adopts the contour of the surface wherein it is disposed while the density, thickness, and surface smoothness thereof has a repeatability and reproducibility previously unknown. Additionally, repetitive sealing processes are no longer restricted by operator technique, and automated processes which require uniformity and consistency are greatly enhanced when the presented film technique is adopted.

While there have been shown and described what are at present considered the preferred embodiments of the present invention, it will be ovious to those skilled in the art that various changes and modifications may be made therein without departing from the invention as defined by the appended claim.

What is claimed is:

A process for bonding glass surfaces comprising forming a self-supporting film comprising powdered glass particles homogeneously dispersed throughout a binder and a binder plasticizer, said particles constituting a weight of 75 to 98 percent of the total film weight, and said film having a density between 1.0 and 3.5 gms./cm.$^3$ and a thickness between 0.005 and 0.0005 inch;

wetting one of said surfaces to be bonded with a solvent for said film binder;

contacting said solvent wetted surface and said film whereupon said solvent softens said film and said film adopts the contour of and adheres to said surface;

assembling said adherent film-covered surface and a glass surface into a contactual related assembly; and firing said assembly to volatilize said binder and plasticizer from said film and fuse said particles together and to said surfaces thereby forming bonded surfaces.

References Cited by the Examiner

UNITED STATES PATENTS

| | | | |
|---|---|---|---|
| 2,461,878 | 2/1949 | Christensen et al. | 29—473.1 |
| 2,570,248 | 10/1951 | Kelley | 29—473.1 |
| 2,706,682 | 4/1955 | Barnard et al. | 75—208 |
| 2,724,892 | 11/1955 | Knonchel et al. | 75—208 |
| 2,750,657 | 6/1956 | Herbert et al. | 29—473.1 |
| 2,771,969 | 11/1956 | Brownlow | 29—471.9 |
| 2,798,577 | 7/1957 | La Forge | 29—473.1 |
| 2,986,671 | 5/1961 | Kerstetter et al. | 313—344 X |
| 3,006,069 | 10/1961 | Rhoads et al. | 75—208 |

CARL D. QUARFORTH, *Primary Examiner.*

REUBEN EPSTEIN, *Examiner.*